United States Patent
[15] 3,688,179
[45] Aug. 29, 1972

Burns

[54] CONDUCTED NOISE RECTIFYING FILTER

[72] Inventor: Clence L. Burns, Tempe, Ariz.

[73] Assignee: Motorola, Inc., Franklin Park, Ill.

[22] Filed: Oct. 26, 1970

[21] Appl. No.: 83,942

[52] U.S. Cl. ..........................321/10, 321/9, 321/47
[51] Int. Cl. ..............................................H02m 1/14
[58] Field of Search .......321/9, 10, 11, 8, 47; 333/79

[56] References Cited

UNITED STATES PATENTS 1,766,051 6/1930 Ackerly ........................321/10
2,914,719 11/1959 Walton et al. ............321/10 X
3,237,080 2/1966 Pudewill .........................321/9
1,965,655 7/1934 Klotz et al. ..................321/10
3,292,072 12/1966 Hylten-Cavallius et al. ............................321/9 R

*Primary Examiner*—William H. Beha, Jr.
*Attorney*—Mueller & Aichele

[57] ABSTRACT

A rectifying filter is disclosed in which the amplitude of the conducted line noise generated by the rectifying process is lower and in which the rectifier current has fewer harmonic components than known such filters and in which furthermore, the operation of the disclosed filter is not decreased in quality due to changes in the loading of the filter as greatly as in known filters. This is accomplished at least in part by inserting filter elements into the rectifying bridge comprising a part of the rectifying filter.

7 Claims, 2 Drawing Figures

INVENTOR.
Clence L. Burns
BY
Mueller & Aichele
ATTY'S.

CONDUCTED NOISE RECTIFYING FILTER

The invention herein described was made in the course of or under a contract with the Department of the Air Force.

BACKGROUND

While prior art rectifier-filter circuits are known, they are not fully satisfactory in that the rectifier current has a harmonic content which appears in the prime or power line of the rectifier-filter circuit. This harmonic noise may be sufficiently large to cause electrical noise in circuits which are fed from the same prime power source as the prior art rectifier-filter circuits. Furthermore, in such known rectifier-filter circuits, a change in the output loading of more than about 5 percent reduces the effectiveness of the rectifier filter to the point where the filter does not attenuate the harmonics produced by the rectifier properly.

It is an object of this invention to provide an improved rectifying filter.

It is a further object of this invention to provide a filter which reduces the conducted noise into the power line, which generates fewer harmonic components and which operates effectively over a larger range of load changes than known rectifying filters.

SUMMARY

In accordance with the invention, a rectifying filter is provided including rectifying elements connected in bridge configuration in which filter elements are included in the bridge, instead of including the filtering elements to one side or the other of the rectifying bridge.

DESCRIPTION

Figure 1:
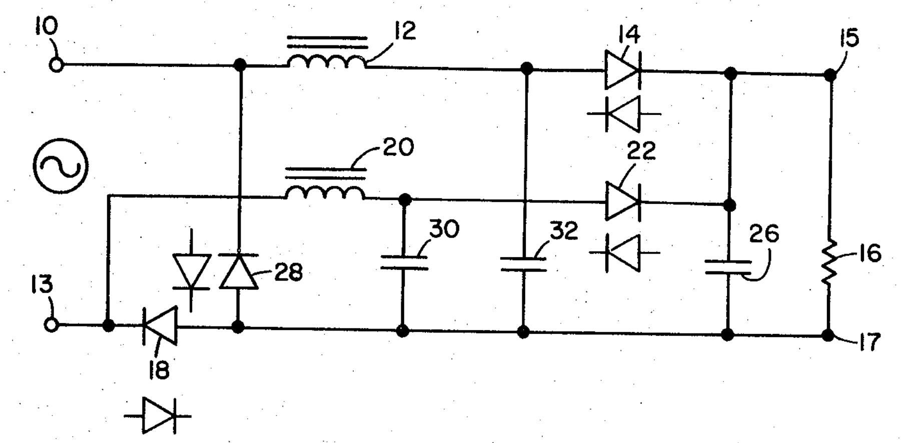
Figure 2:
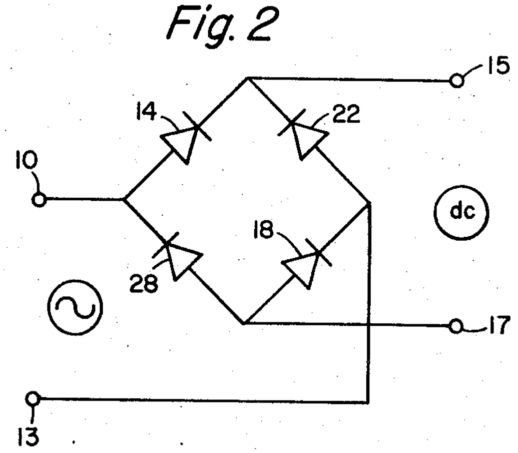

The invention will be better understood upon reading the following description in connection with the accompanying drawing in which FIG. 1 is a schematic circuit diagram of a conducted noise rectifying filter including an embodiment of this invention, and FIG. 2 is a circuit diagram which is useful in explaining the operation of the circuit of FIG. 1.

Turning to FIG. 1, alternating current to be rectified is to be connected across the input or power terminals 10 and 13. The terminal 10 is connected by a way of an iron core inductor 12 to the anode of a rectifying diode 14. The cathode of the diode 14 is connected to one terminal 15 of a load 16, which is illustrated as being a resistor. The other terminal 17 of the load 16 is connected to the anode of the second diode 18 whose cathode is connected to the terminal 13.

The terminal 13 is connected by way of a second iron core inductor 20 to the anode of a third diode 22. The cathode of the third diode 22 is connected directly to the junction of the cathode of the diode 14 and the load terminal 15 and by way of a capacitor 26 to the junction of the load terminal 17 and the diode 18. The anode of a fourth diode 28 is connected to the anode of the diode 18 and the cathode thereof is connected to the terminal 10. A second capacitor 30 is connected between the anodes of the diodes 18 and 22. A third capacitor 32 is connected between the anodes of the diodes 14 and 18. The inductor 12 and the capacitor 32 are tuned to the second harmonic of the alternating current to be applied to the terminals 10 and 12. The inductor 20 and the capacitor 30 are also so tuned.

FIG. 2 shows a known rectifier bridge comprising rectifier diodes connected between input terminals to which an alternating current may be applied and output terminals at which rectifying, though pulsating, current appears. The filter portion of a filtering rectifier, not shown, but to be used with the rectifier bridge of FIG. 2, either precedes the rectifier or follows it or sometimes is spread out in that a portion thereof is before the bridge and another portion thereof is after the rectifying bridge. For the sake of explanation, the same reference characters are being used in FIGS. 1 and 2 to indicate similar elements and similar terminals. If the bridge circuit of FIG. 1 is traced it will be seen that the inductors 12 and 20 are serially connected in the bridge and that the capacitor 30 is in a series circuit including the inductor 20 and the diode 18 while the capacitor 32 is in a series circuit including the inductor 12 and the diode 28, the capacitor 26 being across the output terminals 15 and 17 of the bridge. It is therefore seen that the inductors 12 and 20 are serially connected in the bridge while the capacitors 30 and 32 are connected between an output terminal 17 of the bridge and respective input terminals 13 and 10 through respective inductors 20 and 12.

The operation of the bridge circuit of FIG. 1 may be explained as follows. When the terminal 10 goes positive due to the alternating current supply connected across the terminals 10 and 13, current will flow through inductor 12, capacitor 32 and diode 18 until the voltage developed across the capacitor 32 exceeds the voltage across the capacitor 26. After this time, current will flow through the inductor 12, the rectifier 14, the capacitor 26 and the diode 18. When the voltage at the terminal 10 goes below the voltage across the capacitor 26, the inductor 12 will sustain continued current flow until the energy stored in the inductor 12 is stored in the capacitor 32 or 26, whereby the described circuit has sustained continuous current flow during the positive half cycle of applied alternating current. The current flow is sustained in the same way during the negative half cycle, when the terminal 13 is positive. That is, current flows from the terminal 13 through the inductor 20, the capacitor 30 and the diode 28 to the terminal 10 until the voltage across the capacitor 30 is higher than the voltage across the capacitor 26, when current flows through the inductor 20, the diode 22, the capacitor 26 and the diode 28. When the voltage at the terminal 13 goes down, the energy stored in the inductor 20 causes current to flow through the diode 22 into the capacitor 26 until this energy is transferred to this capacitor 26. Due to the tuning of the circuit comprising the inductor 12 and the capacitor 32, as well as the circuit comprising the inductor 20 and the capacitor 30 to the second harmonic of the applied frequency, the charge and discharge cycles of the inductors 12 and 20 take place at a fixed phase relation to the input alternating current whereby less noise is conducted to the input terminals 10 and 13 of the described rectifying filter than in prior art devices, and there are fewer harmonic components in the input current of the described circuit and the rectifying filter operates properly over a wide range of load changes, in fact up to about 20 percent rather than the 5 percent range of known rectifying filters.

While the diodes are shown connected into the circuit and described in one polarity, the polarity of all thereof may be reversed, as shown by the unconnected diodes adjacent each connected diode, without changing the operation of the circuit.

What is claimed is:

1. A rectifying filter comprising:
- first, second, third and fourth rectifying diodes connected in a full wave rectifying bridge configuration and defining a pair of input terminals and a pair of output terminals,
- first and second inductors each having first and second terminals,
- first and second capacitors each having first and second terminals,
- said first inductor having the first one of its terminals connected to one of said pair of input terminals and being connected in series between two of said diodes in said bridge configuration,
- said second inductor having the first one of its terminals connected to the other one of said pair of input terminals and being connected in series between the other two of said diodes in said bridge configuration,
- said first capacitor being connected from the second terminal of said first inductor and the adjacent diode to that one of said output terminals to form a series circuit of said first inductor and said first capacitor around the non-adjacent diode, and
- said second capacitor being connected from the second terminal of said second inductor and the adjacent diode to said same output terminal to form a series circuit of said second inductor and said second capacitor around the non-adjacent diode.

2. The invention of claim 1 in which an additional capacitor is connected across the terminals of said bridge across which direct current appears.

3. The invention of claim 1 in which said first inductor and said first capacitor and said second inductor and said second capacitor are each tuned to the second harmonic of the frequency of the alternating current to be applied to the bridge.

4. A rectifying filter comprising:
- a first, second, third and fourth diode, each having a first and a second electrode,
- a first and a second inductor,
- a first and a second capacitor,
- means for connecting the first electrode of said first diode by way of said first inductor to the second electrode of said second diode,
- means for connecting the first electrode of said second diode to the first electrode of said third diode,
- means for connecting the second electrode of said third diode by way of said second inductor to the first electrode of said fourth diode,
- means for connecting the second electrode of said fourth diode to the second electrode of said first diode,
- input terminals connected to the second electrodes of said second and third diodes,
- output terminals connected to the first electrodes of said second and third diodes and to the second electrodes of said first and fourth diodes, and
- said first and second capacitors being connected between the same output terminal and respective ones of said input terminals through respective ones of said first and second inductors.

5. The invention of claim 4 in which said first electrodes are cathodes and said second electrodes are anodes.

6. The invention of claim 4 in which said first electrodes are anodes and said second electrodes are cathodes.

7. The invention of claim 6 in which each inductor and its respective capacitor is tuned to a harmonic of the alternating current to be applied to said input terminals.

* * * * *